United States Patent
Luo et al.

(10) Patent No.: US 9,466,118 B2
(45) Date of Patent: Oct. 11, 2016

(54) IMAGE SEGMENTATION DEVICE, IMAGE SEGMENTATION METHOD, AND DEPTH MAP GENERATING METHOD

(71) Applicant: HTC Corporation, Taoyuan County (TW)

(72) Inventors: Sheng-Jie Luo, Taoyuan County (TW); Liang-Kang Huang, Taoyuan County (TW); Tzu-Hao Kuo, Taoyuan County (TW); Yu-Ting Lee, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/578,477

(22) Filed: Dec. 21, 2014

(65) Prior Publication Data

US 2015/0206312 A1 Jul. 23, 2015

Related U.S. Application Data

(60) Provisional application No. 61/928,421, filed on Jan. 17, 2014.

(51) Int. Cl.
*G06K 9/34* (2006.01)
*G06T 7/00* (2006.01)

(52) U.S. Cl.
CPC .......... *G06T 7/0081* (2013.01); *G06T 7/0091* (2013.01); *G06T 2207/10028* (2013.01); *G06T 2207/20104* (2013.01); *G06T 2207/20144* (2013.01)

(58) Field of Classification Search
CPC .............. G06T 7/0081; G06T 7/0083; G06T 2207/10028; G06T 2207/20104; G06T 2207/20144; G06T 2207/20101; G06T 2200/04
USPC .................................. 382/164, 173
See application file for complete search history.

(56) References Cited

U.S. PATENT DOCUMENTS

| 7,773,807 B2 * | 8/2010 | Grady | G06K 9/469 382/173 |
| 8,155,405 B2 * | 4/2012 | Unal | G06K 9/342 382/128 |

(Continued)

FOREIGN PATENT DOCUMENTS

| CN | 103177450 A | 6/2013 |
| CN | 104050682 A | 9/2014 |

(Continued)

OTHER PUBLICATIONS

Corresponding Taiwanese Office Action that these art references were cited on Oct. 19, 2015.
Michael Van Den Bergh et al: "Depth SEEDS: Recovering incomplete depth data using superpixels", Applications of Computer Vision (WACV), 2013 IEEE Workshop ON, IEEE, Jan. 15, 2013, pp. 363-368.

(Continued)

*Primary Examiner* — Kanjibhai Patel
(74) *Attorney, Agent, or Firm* — CKC & Partners Co., Ltd.

(57) ABSTRACT

An image segmentation method includes displaying, through a display component, an image; receiving, through a user input component, a user command relative to an original designation region of the image; shrinking the original designation region according to first depth information corresponding to the image to generate a shrunk designation region of the image; generating a plurality of seeds according to the shrunk designation region and the user command; and segmenting the image according to the seeds to obtain at least one segmented region.

16 Claims, 8 Drawing Sheets

(56) References Cited

U.S. PATENT DOCUMENTS

2010/0286517 A1* 11/2010 Kamen ............ A61B 10/0241
600/438
2012/0275703 A1 11/2012 Lv et al.

FOREIGN PATENT DOCUMENTS

| TW | 451585 | 8/2001 |
| TW | 201421145 A | 6/2014 |

OTHER PUBLICATIONS

Han Jungong et al: "Enhanced Computer Vision With Microsoft Kinect Sensor: A Review", IEEE Transactions on Cybernetics, IEEE, Piscataway, NJ, USA, vol. 43, No. 5, Oct. 1, 2013, pp. 1318-1334.

Fabian Prada et al: "Improving object extraction with depth-based methods", 2013 XXXIX Latin American Computing Conference (CLEI), Oct. 1, 2013, pp. 1-9.

Ju Ran et al: "Stereo GrabCut: Interactive and Consistent Object Extraction for Stereo Images", Dec. 13, 2013, Advances in Communication Networking: 20th EUNICE/IFIP EG 6.2, 6.6 International Workshop, Rennes France, Sep. 1-5, 2014.

Hu He et al: "Graphcut-based interactive segmentation using colour and depth cues", Australasian Conference on Robotics and Automation (ACRA 2010), Dec. 1, 2010, pp. 1-8.

Neven Santrac et al: "High Resolution Segmentation with a Time-of-Flight 3D-Camera using the Example of a Lecture Scene", Sep. 1, 2006, pp. 1-8.

Corresponding European Search Report that these art references were cited on Jul. 17, 2015.

* cited by examiner

IMAGE SEGMENTATION DEVICE, IMAGE SEGMENTATION METHOD, AND DEPTH MAP GENERATING METHOD

RELATED APPLICATIONS

This application claims the priority benefit of U.S. Provisional Application Ser. No. 61/928,421 filed Jan. 17, 2014, the full disclosures of which are incorporated herein by reference.

BACKGROUND

1. Technical Field

The present disclosure relates to an electronic device. More particularly, the present disclosure relates to an image segmentation device, an image segmentation method, and a depth map generating method.

2. Description of Related Art

With advances in image processing technology, image segmentation methods have been widely used.

A typical image segmentation method may be used to segment different portions of an image. For example, in digital photography, an image segmentation method can be used to segment out a main object (i.e., a foreground) from a background of the mage. With such an operation, the main object and the background can be processed separately.

SUMMARY

One aspect of the present disclosure is related to a depth map generating method. In accordance with one embodiment of the present disclosure, the depth map generating method includes dividing, through a processing component, a plurality of pixels of an image into a plurality of superpixels according to colors of the pixels; averaging, through the processing component, a plurality of depth values corresponding to the pixels within each of the superpixels to generate a plurality of average depth values corresponding to the superpixels; and generating, through the processing component, an aligned depth map relative to the superpixels of the image according to the average depth values.

In accordance with one embodiment of the present disclosure, the colors of the pixels within one of the superpixels are substantially identical to each other.

In accordance with one embodiment of the present disclosure, the pixels within one of the superpixels are adjacent to each other.

In accordance with one embodiment of the present disclosure, the step of generating the aligned depth map includes using one of the average depth values corresponding to one of the superpixels to serve as aligned depth values corresponding to the pixels within the one of the superpixels.

Another aspect of the present disclosure is related to an image segmentation method. In accordance with one embodiment of the present disclosure, the image segmentation method includes displaying, through a display component, an image; receiving, through a user input component, a user command relative to an original designation region of the image; shrinking the original designation region according to first depth information corresponding to the image to generate a shrunk designation region of the image; generating a plurality of seeds according to the shrunk designation region and the user command; and segmenting the image according to the seeds to obtain at least one segmented region.

In accordance with one embodiment of the present disclosure, the step of shrinking the original designation region according to the first depth information corresponding to the image includes clustering a plurality of image units within the original designation region of the image into two groups according to the first depth information, and determining the shrunk designation region of the image according to the two groups.

In accordance with one embodiment of the present disclosure, the step of clustering the image units within the original designation region of the image into two groups includes assigning each of the image units within the original designation region a weight corresponding to the distances between the image units within the original designation region and a center of the original designation region, calculating weight-summations by summing the weights corresponding to the image units determined to have an identical depth, and clustering the image units within the original designation region into two groups according to the weight-summations.

In accordance with one embodiment of the present disclosure, the step of determining the shrunk designation region of the image according to the two groups includes selecting a region corresponding to one of the two groups, and eroding the selected region corresponding to the selected group from an edge of the selected region to generate the shrunk designation region of the image.

In accordance with one embodiment of the present disclosure, the image segmentation method further includes dividing a plurality of pixels of the image into a plurality of superpixels according to colors of the pixels, and averaging a plurality of depth values corresponding to the pixels within each of the superpixels to generate a plurality of average depth values corresponding to the superpixels. The superpixels serve as the image units, and the first depth information includes the average depth values corresponding to the superpixels.

In accordance with one embodiment of the present disclosure, the step of segmenting the image according to the seeds to obtain at least one segmented region includes performing a segmentation algorithm according to the image, the seeds, and second depth information, wherein the second depth information includes the average depth values corresponding to the superpixels.

In accordance with one embodiment of the present disclosure, a plurality of pixels of the image serve as the image units, and the depth information includes a plurality of depth values respectively corresponding to the pixels.

In accordance with one embodiment of the present disclosure, the step of generating the seeds according to the shrunk designation region and the user command includes taking a first portion of the pixels of the image located at the edge of the original designation region as background seeds, and taking a second portion of the pixels of the image located within the shrunk designation region as foreground seeds.

Another aspect of the present disclosure is related to an image segmentation device. In accordance with one embodiment of the present disclosure, the image segmentation device includes a display component, a user input component, and a processing component. The display component is configured for displaying an image. The user input component is configured for receiving a user command relative to an original designation region of the image. The processing component is configured for shrinking the original designation region according to depth information corresponding to the image to generate a shrunk designation region of the image, generating a plurality of seeds according to the shrunk designation region and the user command, and segmenting the image according to the seeds to obtain at least one segmented region.

In accordance with one embodiment of the present disclosure, the processing component is further configured for clustering a plurality of image units within the original designation region of the image into two groups according to the first depth information, and determining the shrunk designation region of the image according to the two groups.

In accordance with one embodiment of the present disclosure, the processing component is further configured for assigning each of the image units within the original designation region a weight corresponding to the distances between the image units within the original designation region and a center of the original designation region, calculating weight-summations by summing the weights corresponding to the image units determined to have an identical depth, and clustering the image units within the original designation region into two groups according to the weight-summations.

In accordance with one embodiment of the present disclosure, the processing component is further configured for selecting a region corresponding to one of the two groups, and eroding the selected region corresponding to the selected group from an edge of the selected region to generate the shrunk designation region of the image.

In accordance with one embodiment of the present disclosure, the processing component is further configured for dividing a plurality of pixels of the mage into a plurality of superpixels according to colors of the pixels, and averaging a plurality of depth values corresponding to the pixels within each of the superpixels to generate a plurality of average depth values corresponding to the superpixels. The superpixels serve as the image units, and the first depth information includes the average depth values corresponding to the superpixels.

In accordance with one embodiment of the present disclosure, the processing component is further configured for performing a segmentation algorithm according to the image, the seeds, and second depth information, wherein the second depth information includes the average depth values corresponding to the superpixels.

In accordance with one embodiment of the present disclosure a plurality of pixels of the image serve as the image units, and the depth information includes a plurality of depth values respectively corresponding to the pixels.

In accordance with one embodiment of the present disclosure, the processing component is further configured for taking a first portion of the pixels of the image located at the edge of the original designation region as background seeds, and taking a second portion of the pixels of the image located within the shrunk designation region as foreground seeds.

Through an application of one embodiment described above, the image can be segmented in accordance with the first depth information corresponding to the image, such that precise image segmentation can be realized.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. in contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below,""left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

One aspect of the present disclosure is related to an image segmentation device. In the paragraphs below, a smart phone or a tablet computer will be taken as an example to describe details of the image segmentation device. However, the present disclosure is not limited in this regard.

Figure 1:
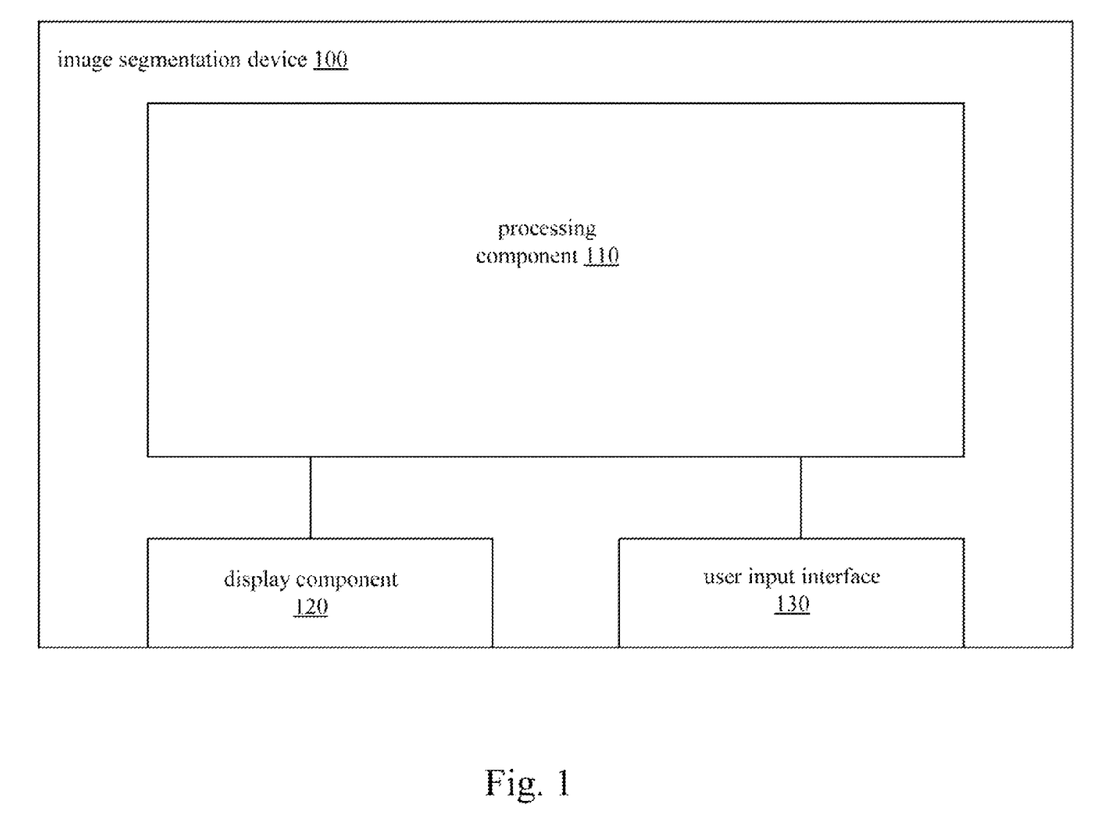
FIG. 1 is a schematic diagram of an image segmentation device in accordance with one embodiment of the present disclosure.

FIG. 1 is a schematic diagram of an image segmentation device 100 in accordance with one embodiment of the present disclosure. In this embodiment, the image segmentation device 100 includes a processing component 110, a display component 120, and a user input interface 130. In one embodiment, the processing component 110 is electrically connected to the display component 120 and the user input interface 130.

In one embodiment, the processing component 110 can be realized by, for example, a processor, such as a central processor, a microprocessor, or a digital signal processor (DSP), but is not limited in this regard. The display component 120 can be realized by, for example, a display, such as a liquid crystal display, an active matrix organic light emitting display (AMOLED), or an e-paper display, but is not limited in this regard. The user input interface 130 can be realized by, for example, a touch sensing module, a keyboard, or a mouse, but is not limited in this regard. In one embodiment, the display component 120 and the user input interface 130 can be integrated as a touch display component, but the present disclosure is not limited to such an embodiment.

In one embodiment, the display component 120 is configured to display an image. The user input interface 130 is configured to receive a user command by a user. The processing component 110 is configured to segment the image according to the image, the user command, and depth information corresponding to the image.

Details of the present disclosure are described in the paragraphs below with reference to a flowchart of an image segmentation method shown in FIG. 2. However, the present disclosure is not limited to the embodiment below.

It should be noted that the image segmentation method can be applied to an image segmentation device having a structure that is the same as or similar to the structure of the image segmentation device 100 shown in FIG. 1. To simplify the description below, in the following paragraphs, the embodiment shown in FIG. 1 will be used as an example to describe the image segmentation method according to an embodiment of the present disclosure. However, the present disclosure is not limited to application to the embodiment shown in FIG. 1.

In addition, it should be noted that in the steps of the following image segmentation method, no particular sequence is required unless otherwise specified. Moreover, the following steps also may be performed simultaneously or the execution times thereof may at least partially overlap.

Furthermore, the steps of the following image segmentation method may be added to, replaced, and/or eliminated as appropriate, in accordance with various embodiments of the present disclosure.

Figure 2:
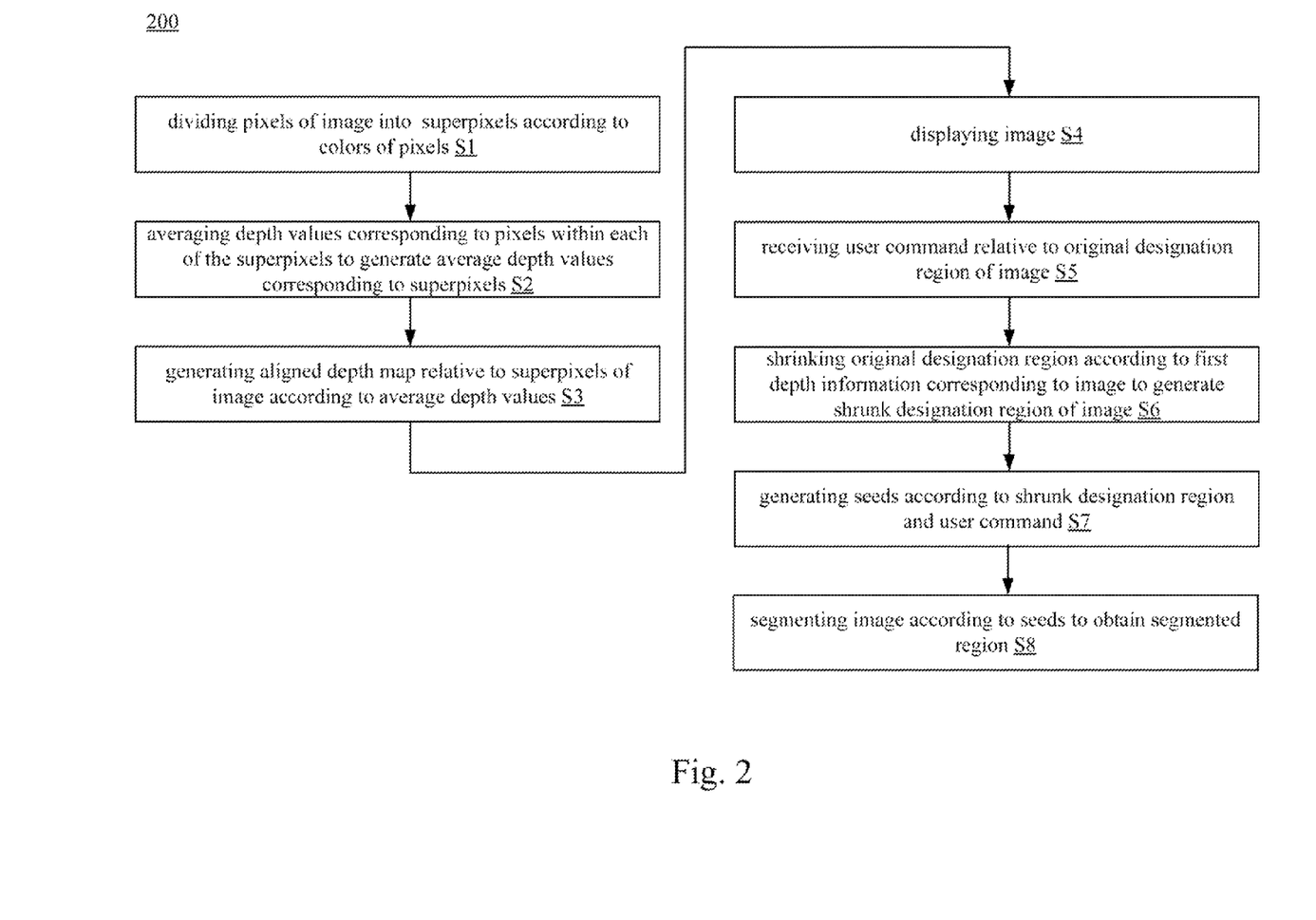
FIG. 2 is a flowchart of an image segmentation method in accordance with one embodiment of the present disclosure.

Reference is made to FIG. 2. The image segmentation method 200 includes the steps outlined below.

In step S1, the processing component 110 acquires an image having a plurality of pixels (e.g., via a camera or stored in a storage medium), and divides the pixels of the image into a plurality of superpixels (e.g., a group of neighboring pixels) according to the colors of the pixels.

In one embodiment, the processing component 110 may execute an over-segmentation algorithm on the image to divide the pixels of the image into the superpixels. In one embodiment, each of the superpixels has more than one pixel. In one embodiment, the pixels within one of the superpixels are substantially identical to each other in color. In one embodiment, the pixels within one of the superpixels are adjacent to each other.

In step S2, the processing component 110 acquires a depth map relative to the image which includes a plurality depth values respectively corresponding to the pixels of the image (e.g., via a sensor or stored in a storage medium). Subsequently, the processing component 110 averages the depth values corresponding to the pixels within each of the superpixels to generate a plurality of average depth values corresponding to the superpixels.

In step S3, the processing component 110 generates an aligned depth map relative to the superpixels of the image according to the average depth values. In one embodiment, the processing component 110 may use the average depth values to serve as the aligned depth values relative to the pixels within the corresponding superpixels (that is, the aligned depth values relative to the pixels within one superpixel are identical). For example, the processing component 110 may use a first average depth value corresponding to a first superpixel to serve as the aligned depth values relative to the pixels within the superpixel.

Through such an operation, the edges of the aligned depth map can be aligned to the boundaries of the superpixels.

Figure 3A:
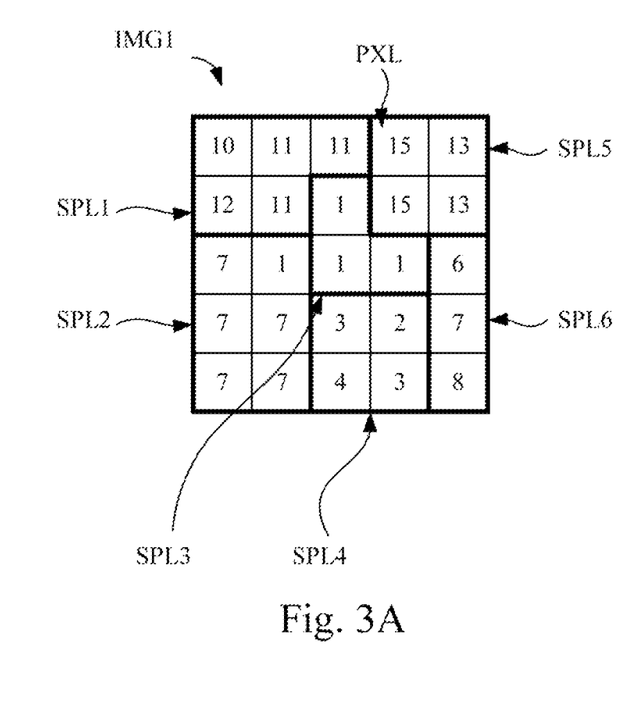
FIGS. 3A and 3B illustrate an operative example of generating an aligned depth map in accordance with one embodiment of the present disclosure.
Figure 3B:
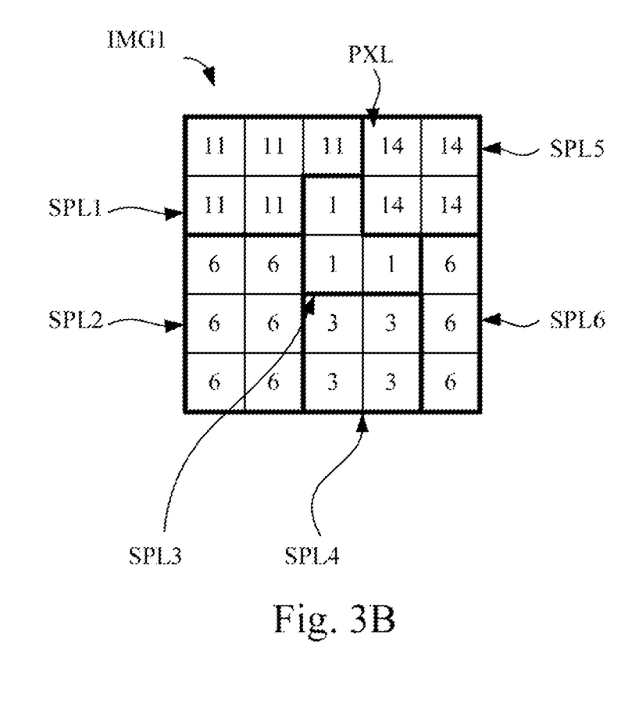

To facilitate the description to follow, an operative example is described below with reference to FIGS. 3A and 3B. However, it should be noted that the present disclosure is not limited to the embodiment below.

In this operative example, an image IMG1 has a plurality of pixels PXL (e.g., 25 pixels), and the pixels can be divided into a plurality of superpixels (e.g., superpixels SPL1-SPL6). As shown in FIG. 3A, the depth values of the pixels within the superpixel SPL1 are 10, 11, 11, 12, and 11, and the average depth value of the superpixel SPL1 is 11. The depth values of the pixels within the superpixel SPL2 are 7, 1, 7, 7, 7, and 7, and the average depth value of the superpixel SPL2 is 6. The depth values of the pixels within the superpixel SPL3 are 1, 1, and 1, and the average depth value of the superpixel SPL3 is 1. The depth values of the pixels within the superpixel SPL4 are 3, 2, 4, and 3, and the average depth value of the superpixel SPL1 is 3. The depth values of the pixels within the superpixel SPL5 are 15, 13, 15, and 13, and the average depth value of the superpixel SPL5 is 14. The depth values of the pixels within the superpixel SPL6 are 6, 7, and 8, and the average depth value of the superpixel SPL6 is 7. The processing component 110 may use the average depth values of the superpixel SPL1 (i.e., 11) as the aligned depth values of the pixels within the superpixel SPL1, the average depth values of the superpixel SPL2 (i.e., 6) as the aligned depth values of the pixels within the superpixel SPL2, the average depth values of the superpixel SPL3 (i.e., 1) as the aligned depth values of the pixels within the superpixel SPL3, the average depth values of the superpixel SPL4 (i.e., 3) as the aligned depth values of the pixels within the superpixel SPL4, the average depth values of the superpixel SPL5 (i.e., 14) as the aligned depth values of the pixels within the superpixel SPL5, and the average depth values of the superpixel SPL6 (i.e., 6) as the aligned depth values of the pixels within the superpixel SPL6, so as to generate the aligned depth map (as shown in FIG. 3B).

By utilizing the superpixels and the aligned depth map to segment the image, the subsequent computations can be simplified. In addition, since the inaccuracy of depth detection (which always occurs at a boundary of the foreground of an image) can be minimized by averaging the depth values corresponding to the pixels, the accuracy of image segmentation can be increased through such utilization of the average depth values. However, in some embodiments, the processing component 110 can still use the original pixels and depth values to perform image segmentation, and the present disclosure is not limited to the embodiment above (in such embodiments, steps S1-S3 may be omitted).

In step S4, the processing component 110 utilizes the display component 120 to display an image.

In step S5, the processing component 110 utilizes the user input interface 120 to receive a user command provided by a user. In one embodiment, the user command corresponds to an original designation region of the image. In one embodiment, the user command may be provided by using a finger, a stylus, a mouse, or a keyboard, but the disclosure is not limited in this regard. In one embodiment, the user command may include a closed trace relative to the image, and a region enclosed by the trace may serve as the original designation region (that is, the pixels or superpixels covered and enclosed by the trace may be taken as the original designation region). In one embodiment, the user command may include an unclosed trace relative to the image, and the processing component 110 may (automatically) seal the trace, so as to obtain the original designation region. In one embodiment, the original designation region encompasses the object which is desired to be segmented out.

In step S6, the processing component 110 shrinks the original designation region according to first depth information corresponding to the image to generate a shrunk designation region of the image. In one embodiment, the first depth information may include the depth values corresponding to the pixels and/or the average depth values corresponding to the superpixels. In one embodiment, the shrunk designation region is substantially equal to or smaller than the object which is desired to be segmented out.

In one embodiment, in step S6, the processing component 110 may cluster a plurality of the superpixels or the pixels (referred as image units hereafter) within the original designation region of the image into a foreground group and a background group according to the first depth information.

After the above process, the processing component 110 selects a region corresponding to the foreground group of the image units. At this time, the selected region corresponding to the selected image units is substantially identical to the object which is desired to be segmented out (since the desired object is usually a foreground of the image), although some errors may still exist.

Subsequently, the processing component 110 erodes the selected region corresponding to the selected group from the edge of the selected region (that is, removes an outer portion of the selected region along the edge of the selected region), so as to generate the shrunk designation region of the image. At this time, all of the shrunk designation region is located on the object which is desired to be segmented out. In one embodiment, the processing component 110 erodes the selected region corresponding to the selected group from the edge of the selected region for a few pixels or superpixels (e.g., 10 pixels or subpixels).

It should be noted that, in another embodiment, the eroding operation can be omitted, and the selected region corresponding to the selected group may be taken as the shrunk designation region in such an embodiment.

In step S7, the processing component 110 generates a plurality of seeds according to the shrunk designation region and the user command. In one embodiment, the seeds include foreground seeds and background seeds. In one embodiment, the processing component 110 may take a first portion of the pixels located at the edge of the original designation region as the background seeds, and take a second portion of the pixels of the in located within the shrunk designation region as the foreground seeds. In one embodiment, the pixels covered by the trace and/or around the trace are taken as the background seeds. In one embodiment, all of the pixels within the superpixels covered by the trace and/or around the trace are taken as the background seeds.

In step S8, the processing component 110 segments the image according to the seeds to obtain at least one segmented region. In one embodiment, the processing component 110 may execute an image segmentation algorithm according to the image (e.g., the color of the image), the seeds, and the second depth information, so as to segment the image. In one embodiment, the second depth information may include the average depth values corresponding to the superpixels. Since the inaccuracy of depth detection (which always occurs at a boundary of a foreground of the image) can be minimized by averaging the depth values corresponding to the pixels, the accuracy of image segmentation can be increased through such utilization of the average depth values. However, in another embodiment, the image segmentation may be performed according to the original depth values corresponding to the pixels (i.e., the second depth information simply includes the original depth values corresponding to the pixels), and the present disclosure is not limited to the embodiment above.

In one embodiment, the image segmentation algorithm may be a modified graph cut algorithm, but is not limited in this regard. It should be noted that a graph cut algorithm is configured to receive foreground and background seeds provided by a user, in order to segment a foreground or a background of an image according to the color of the image and the foreground and background seeds. In one embodiment, the graph cut algorithm may be modified to segment an image according to the color of the image, the foreground and background seeds, and the second depth information, so as to increase accuracy of the image segmentation.

Through the operations described above, the image can be segmented in accordance with the depth information corresponding to the image, such that precise image segmentation can be realized.

To facilitate the description to follow, an operative example is described below with reference to FIGS. 4A and 4C. However, it should be noted that the present disclosure is not limited to the embodiment below.

Figure 4A:
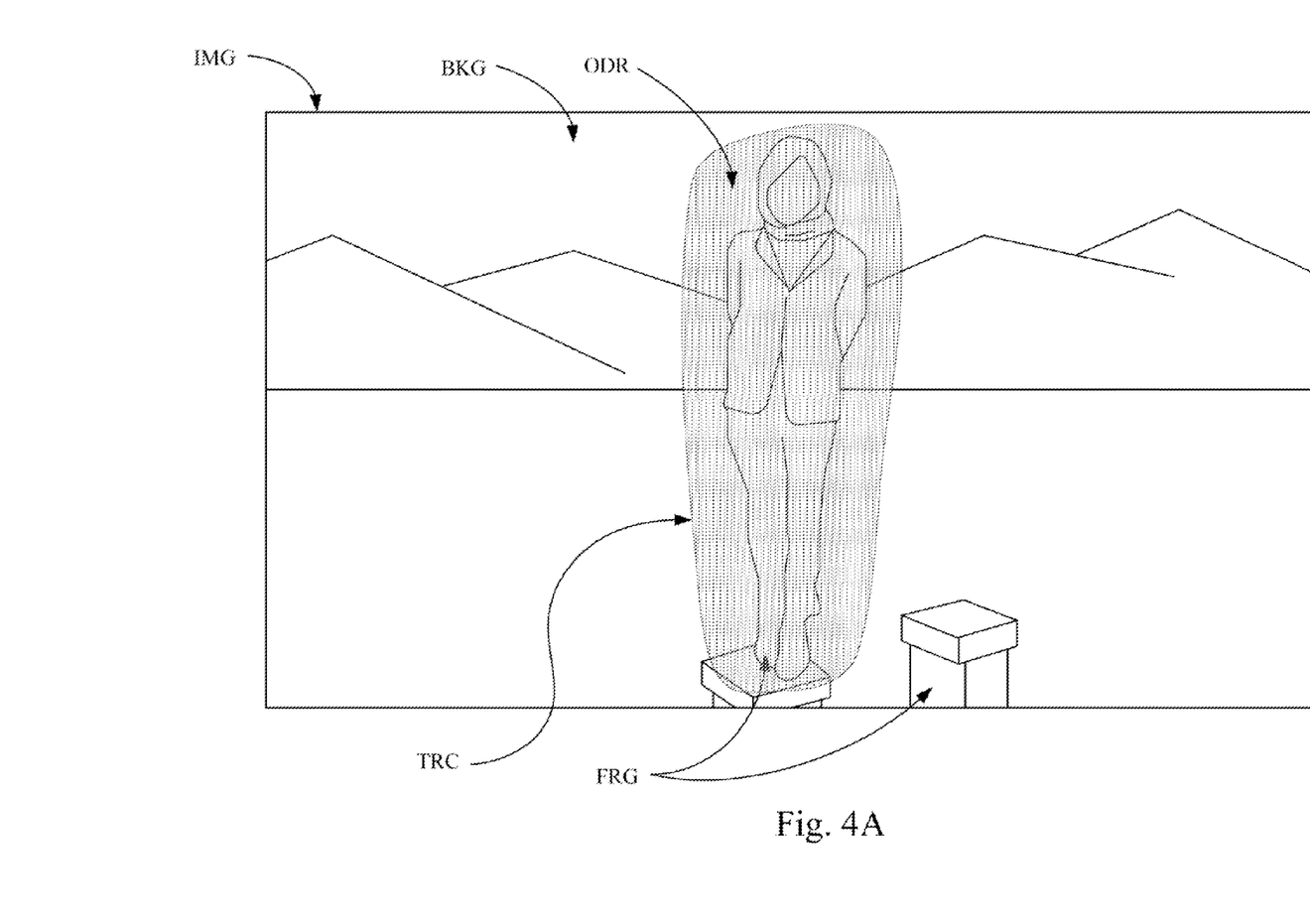
FIGS. 4A-4C illustrate an operative example of image segmentation method in accordance with one embodiment of the present disclosure.

Reference is made to FIG. 4A. An image IMG is displayed on the display component 120. The image IMG has a foreground FRG (e.g., a figure and stages) and a background BKG. A user may draw a trace TRC around the desired object (e.g., the figure), so as to encircle an original designation region ODR of the image IMG.

Figure 4B:
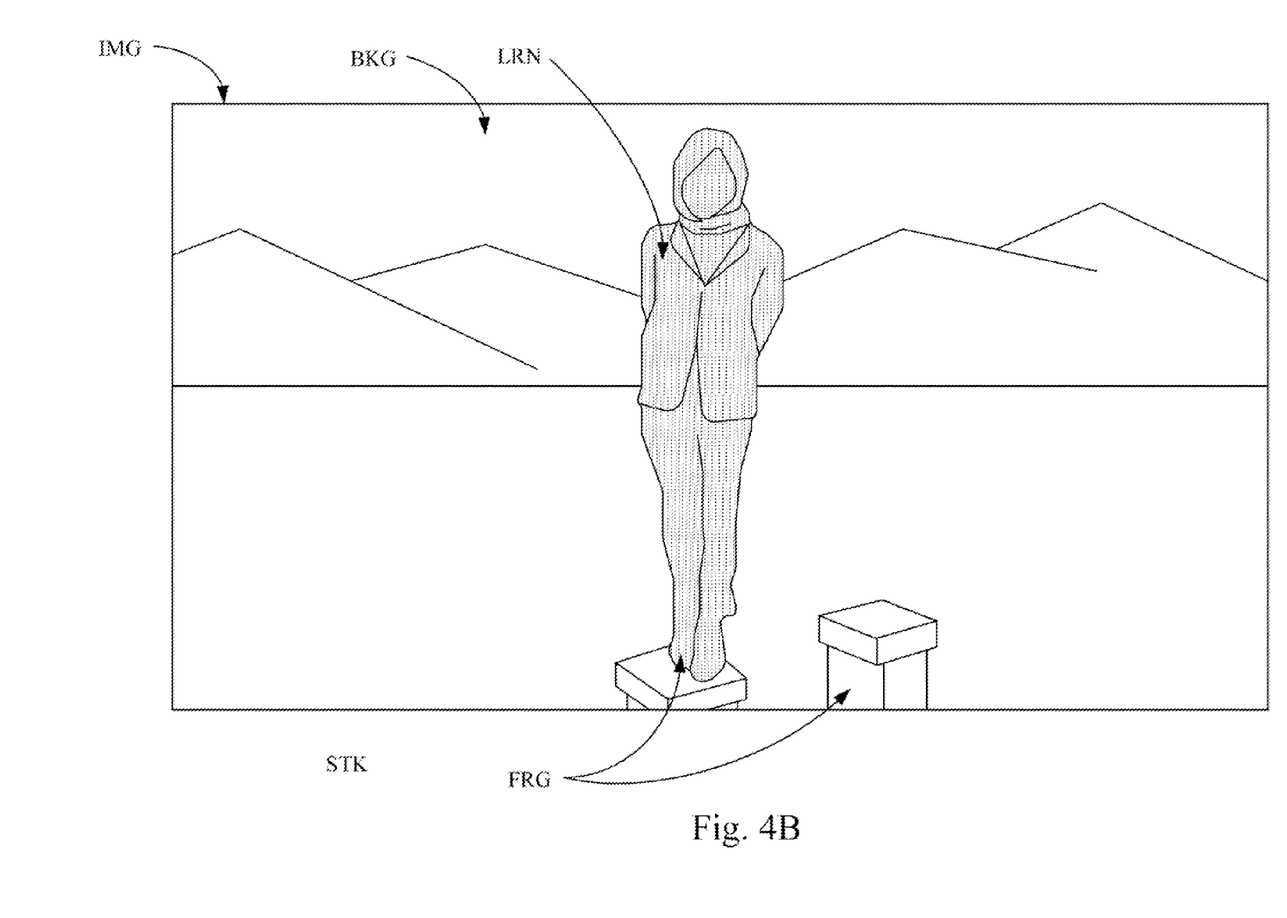

Reference is now made to FIG. 4B. The processing component 110 clusters the image units (i.e., the superpixels or pixels) within the original designation region ODR of the image IMG into a foreground group and a background group according to the first depth information. Subsequently, the processing component 110 selects a region LRN corresponding to the foreground group of the image units to perform the subsequent operation. In other words, the processing component 110 removes the background group of the image units from the original designation region ODR.

Figure 4C:
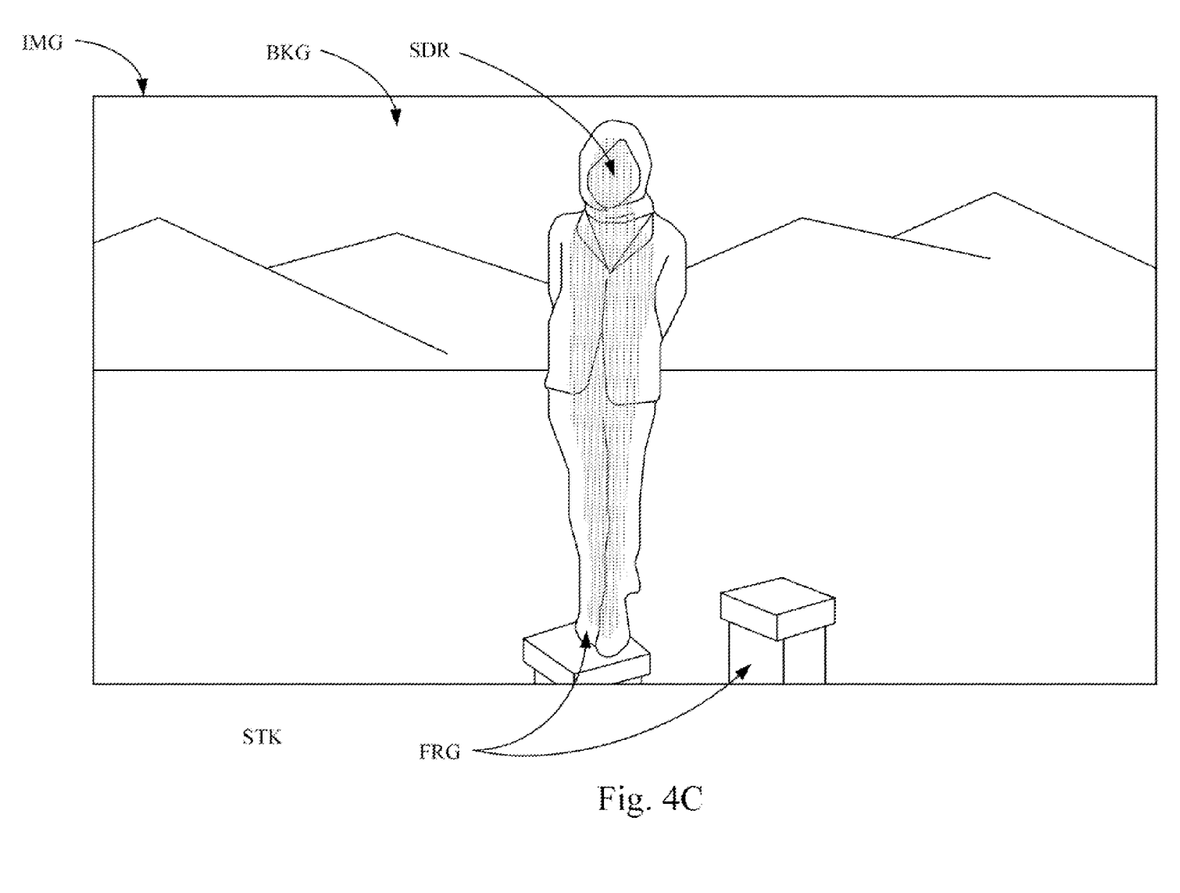

Next, as shown in FIG. 4C, the processing component 110 erodes the selected region LRN from the edge of the selected region LRN, so as to generate the shrunk designation region SDR of the image IMG. After this process, the processing component 110 takes the pixels of the image IMG located at the edge of the original designation region ODR as the background seeds and takes the pixels of the image IMG located within the shrunk designation region SDR as the foreground seeds, and accordingly segments the image IMG.

Through the operations above, the foreground and background seeds can be generated according to the depth information accurately, such that precise image segmentation can be realized.

In one embodiment, after the original designation region is determined, the processing component 110 assigns each of image units a weight and clusters the image units within the original designation region according to the weights. In one embodiment, the weights of the image units within the original designation region correspond to the distance between the image units within the original designation region and a center of the original designation region. The smaller the distance, the greater the weight. In one embodiment, the center of the original designation region can be calculated according to the edge of the original designation region, but the present disclosure is not limited in this regard.

After the weights are assigned, the processing component 110 calculates weight-summations by summing the weights corresponding to the image units that are determined to have an identical depth. For example, when two pixels have the same depth value, the two pixels are determined to have an identical depth, and the weights of the two image units are added to generate a weight-summation corresponding to this depth value. As another example, when two superpixels have the same average depth value, the two superpixels are determined to have an identical depth, and the weights of the two image units are added to generate a weight-summation corresponding to this average depth value.

Subsequently, the processing component 110 clusters the image units according to the weight-summations corresponding to different depths.

To facilitate the description to follow, two operative examples are described below with reference to FIGS. 5A-6B. However, it should be noted that the present disclosure is not limited to the embodiments below.

Figure 5A:
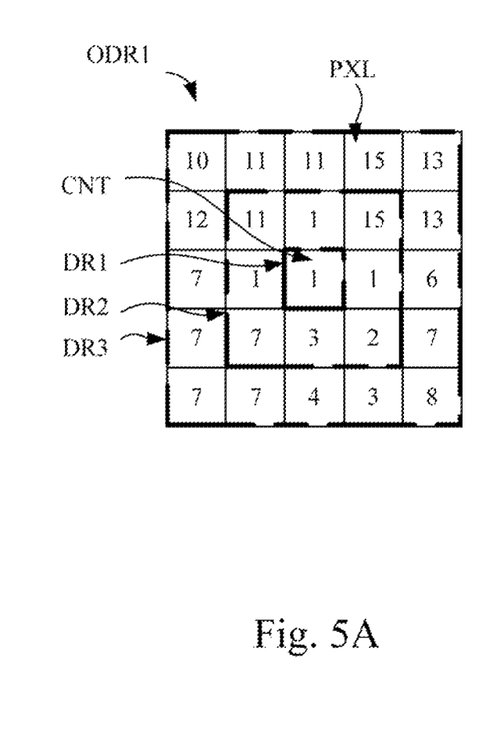
FIGS. 5A and 5B illustrate an operative example of clustering an original designation region in accordance with one embodiment of the present disclosure.
Figure 5B:
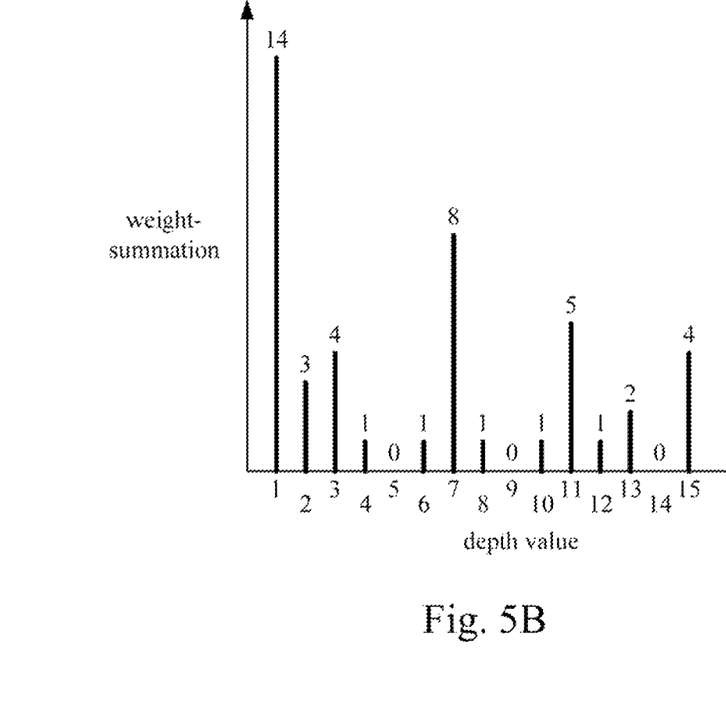

Reference is now made to FIGS. 5A and 5B. In one operative example, in the case where the pixels PXL in the original designation region ODR1 are not divided into superpixels, the processing component 110 can assign the center pixel CNT in the region DR1 a weight w1 (e.g., a value of 5), assign the intermediate pixels in the region DR2 (e.g., the pixels with depth values 11, 1, 15, 1, 2, 3, 7, and 1) a weight w2 (e.g., a value of 3), and assign the outer pixels in the region DR3 (e.g. the pixels with depth values 10, 11, 11, 15, 13, 13, 6, 7, 8, 3, 4, 7, 7, 7, 7, and 12) a weight w3 (e.g., a value of 1). Since there are one pixel with a depth value equal to 1 in the region DR1, three pixels with depth values equal to 1 in the region DR2, and zero pixels with a depth value equal to 1 in the region DR3, the weight-summation corresponding to the depth value which is equal to 1 is 5*1+3*3=14. In addition, since there is one pixel with a depth value equal to 2 in the region DR2 and zero pixels with a depth value equal to 2 in the regions DR1, DR3 the weight-summation corresponding to the depth value which is equal to 2 is 3*1=3. The rest may be deduced by analogy. Through such calculations, a histogram of the weight-summations corresponding to the depth value can be acquired (see FIG. 5B).

Subsequently, the processing component 110 may perform a mean shift algorithm to cluster the pixels according to the weight-summations. In this example, the pixels with depth values equal to 1-4 may be clustered as a group G1, and the pixels with depth values equal to 5-15 may be clustered as another group G2. The group with higher weight-summations (e.g. the group G1) is determined to be the foreground group, and the group with lower weight-summations is determined to be the background group.

Figure 6A:
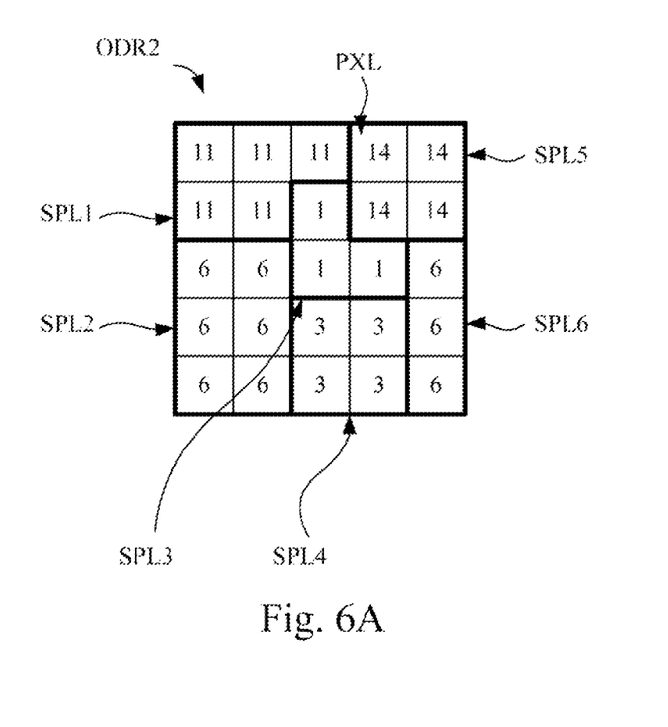
FIGS. 6A and 6B illustrate an operative example of clustering an original designation region in accordance with another embodiment of the present disclosure.
Figure 6B:
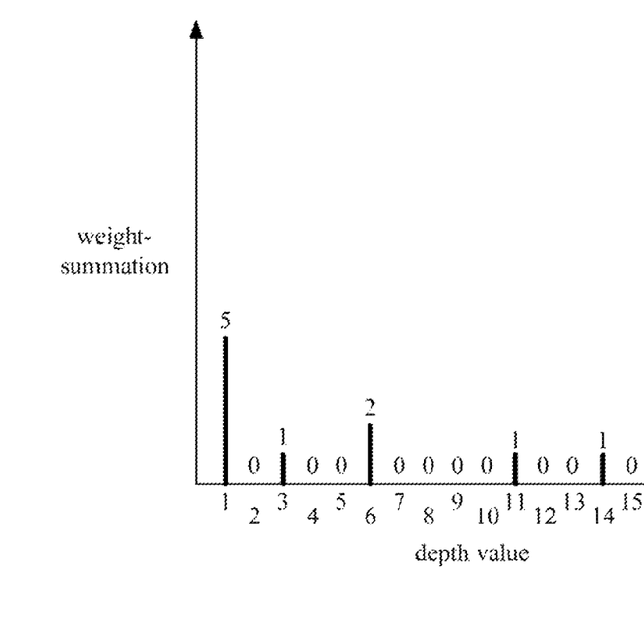

Reference is now made to FIGS. 6A and 6B. In another operative example, the pixels PXL in the original designation region ODR2 are divided into a plurality of superpixels SPL1-SPL6, and the depth values of the pixels in each of the superpixels SPL1-SPL6 are identical (i.e., they have been averaged). The processing component 110 can assign the center superpixel SPL3 a weight w1 (e.g., a value of 5) and assign the superpixels SPL1-2, SPL4-SPL6 which are adjacent to center superpixel SPL3 a weight w2 (e.g., a value of 1). Since there is one center superpixel with an average depth value equal to 1, the weight-summation corresponding to the average depth value which is equal to 1 is 5*1=5. Since there is one superpixel with an average depth value equal to 3, the weight-summation corresponding to the average depth value which is equal to 3 is 1*1=1. Since there are two superpixels with average depth values equal to 6, the weight-summation corresponding to the average depth value which is equal to 6 is 1*2=2. The rest may be deduced by analogy. Through such calculations, a histogram of the weight-summations corresponding to the average depth value can be acquired.

Subsequently, the processing component 110 may perform a mean shift algorithm to cluster the superpixels according to the weight-summations. In this example, the superpixels SPL3, SPL4 may be clustered as a group G3, and the superpixels SPL1, SPL2, SPL5, SPL6 may be clustered as another group G4. The group with higher weight-summations (e.g., the group G3) is determined to be the foreground group, and the group with lower weight-summations is determined to be the background group.

Through such an operation, the image units within the original designation region can be clustered into two different groups according to the depth information.

Although the present invention has been described in considerable detail with reference to certain embodiments thereof, other embodiments are possible. Therefore, the scope of the appended claims should not be limited to the description of the embodiments contained herein.

What is claimed is:
1. An image segmentation method comprising:
displaying, through a display component, an image;
receiving, through a user input component, a user command relative to an original designation region of the image;
shrinking the original designation region according to first depth information corresponding to the image to generate a shrunk designation region of the image;
generating a plurality of seeds according to the shrunk designation region and the user command; and
segmenting the image according to the seeds to obtain at least one segmented region.

2. The image segmentation method as claimed in claim 1, wherein the step of shrinking the original designation region according to the first depth information corresponding to the image comprises:
  clustering a plurality of image units within the original designation region of the image into two groups according to the first depth information; and
  determining the shrunk designation region of the image according to the two groups.

3. The image segmentation method as claimed in claim 2, wherein the step of clustering the image units within the original designation region of the image into two groups comprises:
  assigning each of the image units within the original designation region a weight corresponding to the distances between the image units within the original designation region and a center of the original designation region;
  calculating weight-summations by summing the weights corresponding to the image units determined to have an identical depth; and
  clustering the image units within the original designation region into two groups according to the weight-summations.

4. The image segmentation method as claimed in claim 2, wherein the step of determining the shrunk designation region of the image according to the two groups comprises:
  selecting a region corresponding to one of the two groups; and
  eroding the selected region corresponding to the selected group from an edge of the selected region to generate the shrunk designation region of the image.

5. The image segmentation method as claimed in claim 2 further comprising:
  dividing a plurality of pixels of the image into a plurality of superpixels according to colors of the pixels; and
  averaging a plurality of depth values corresponding to the pixels within each of the superpixels to generate a plurality of average depth values corresponding to the superpixels;
  wherein the superpixels serve as the image units, and the first depth information comprises the average depth values corresponding to the superpixels.

6. The image segmentation method as claimed in claim 5, wherein the step of segmenting the image according to the seeds to obtain at least one segmented region comprises:
  performing a segmentation algorithm according to the image, the seeds, and second depth information, wherein the second depth information comprises the average depth values corresponding to the superpixels.

7. The image segmentation method as claimed in claim 2, wherein a plurality of pixels of the image serve as the image units, and the depth information comprises a plurality of depth values respectively corresponding to the pixels.

8. The image segmentation method as claimed in claim 1, wherein the step of generating the seeds according to the shrunk designation region and the user command comprises:
  taking a first portion of the pixels of the image located at the edge of the original designation region as background seeds; and
  taking a second portion of the pixels of the image located within the shrunk designation region as foreground seeds.

9. An image segmentation device comprises:
  a display component configured for displaying an image;
  a user input component configured for receiving a user command relative to an original designation region of the image; and
  a processing component configured for:
    shrinking the original designation region according to depth information corresponding to the image to generate a shrunk designation region of the image;
    generating a plurality of seeds according to the shrunk designation region and the user command; and
    segmenting the image according to the seeds to obtain at least one segmented region.

10. The image segmentation device as claimed in claim 9, wherein the processing component is further configured for:
  clustering a plurality of image units within the original designation region of the image into two groups according to the depth information; and
  determining the shrunk designation region of the image according to the two groups.

11. The image segmentation device as claimed in claim 10, wherein the processing component is further configured for:
  assigning each of the image units within the original designation region a weight corresponding to the distances between the image units within the original designation region and a center of the original designation region;
  calculating weight-summations by summing the weights corresponding to the image units determined to have an identical depth; and
  clustering the image units within the original designation region into two groups according to the weight-summations.

12. The image segmentation device as claimed in claim 10, wherein the processing component is further configured for:
  selecting a region corresponding to one of the two groups; and
  eroding the selected region corresponding to the selected group from an edge of the selected region to generate the shrunk designation region of the image.

13. The image segmentation device as claimed in claim 10, wherein the processing component is further configured for:
  dividing a plurality of pixels of the image into a plurality of superpixels according to colors of the pixels; and
  averaging a plurality of depth values corresponding to the pixels within each of the superpixels to generate a plurality of average depth values corresponding to the superpixels;
  wherein the superpixels serve as the image units, and the depth information comprises the average depth values corresponding to the superpixels.

14. The image segmentation device as claimed in claim 13, wherein the processing component is further configured for:
  performing a segmentation algorithm according to the image, the seeds, and second depth information, wherein the second depth information comprises the average depth values corresponding to the superpixels.

15. The image segmentation device as claimed in claim 10, wherein a plurality of pixels of the image serve as the image units, and the depth information comprises a plurality of depth values respectively corresponding to the pixels.

16. The image segmentation device as claimed in claim 9, wherein the processing component is further configured for:

taking a first portion of the pixels of the image located at the edge of the original designation region as background seeds; and taking a second portion of the pixels of the image located within the shrunk designation region as foreground seeds.

* * * * *